No. 654,375. Patented July 24, 1900.
J. F. WILSON.
REGULATOR FOR BALL BEARINGS.
(Application filed Oct. 10, 1899.)
(No Model.)
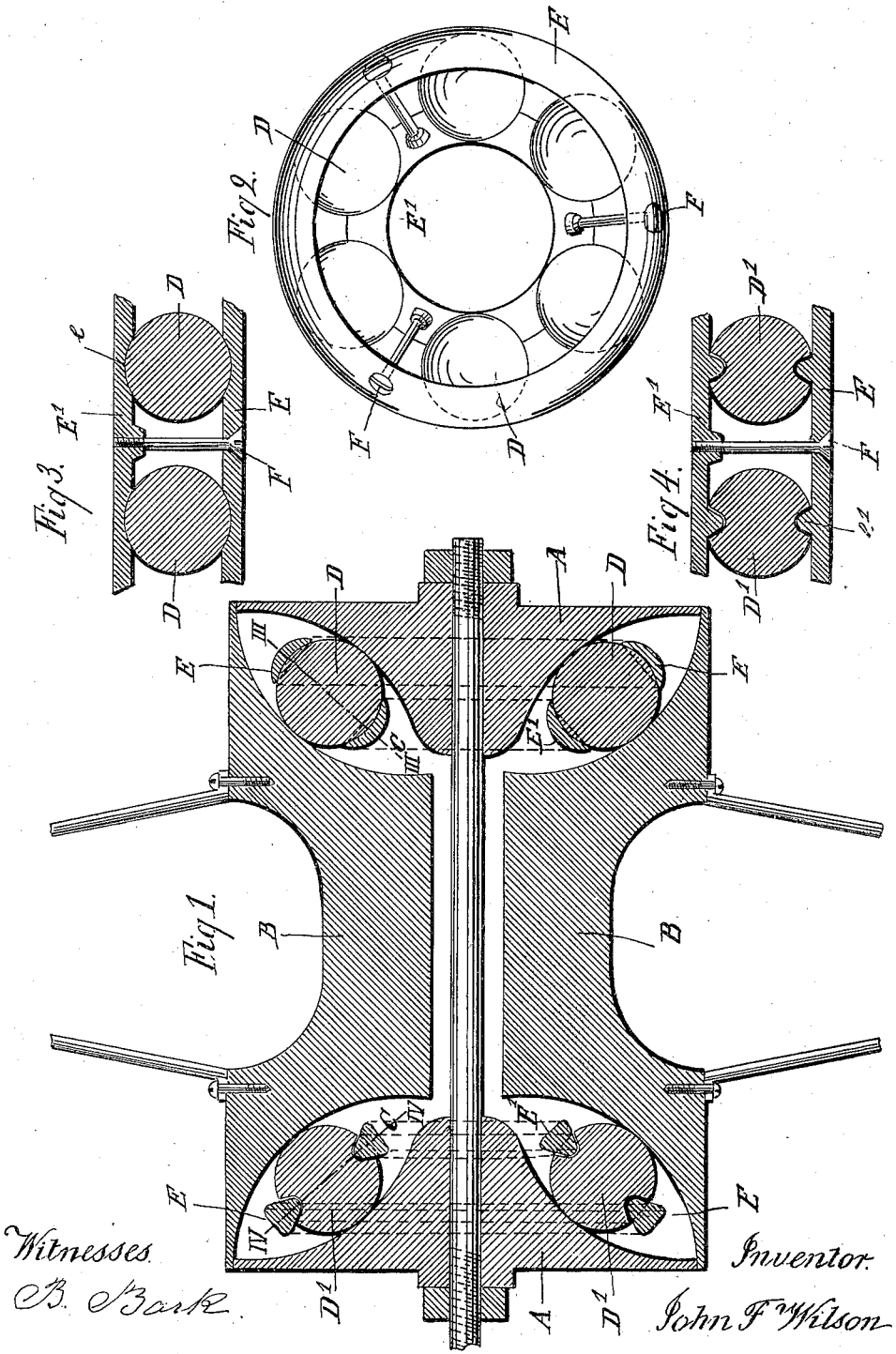
Witnesses
Inventor
John F. Wilson
by his Attorneys

UNITED STATES PATENT OFFICE.

JOHN FAY WILSON, OF JETMORE, KANSAS.

REGULATOR FOR BALL-BEARINGS.

SPECIFICATION forming part of Letters Patent No. 654,375, dated July 24, 1900.

Application filed October 10, 1899. Serial No. 733,156. (No model.)

*To all whom it may concern:*

Be it known that I, JOHN FAY WILSON, a citizen of the United States, residing at Jetmore, in the county of Hodgman and State of Kansas, have invented a new and useful Regulator for Ball-Bearings, of which the following is a specification.

My invention relates to a device for preventing the "bunching" or collecting together of the balls in a ball-bearing; and it consists in mounting within each of the raceways of such a bearing a pair of connected rings which inclose the balls between them, so that they rotate with the balls, and each ball throughout its revolution around the hub is kept from contact with any of its fellows, and all the balls maintain at all times their proper distance from and relation to each other and other parts of the hub.

In the accompanying drawings, Figure 1 is a section through a ball-bearing vehicle-hub provided with my device. Fig. 2 is a perspective view of a set of balls and the inclosing rings composing the rotating frame as they would appear detached from the hub. Fig. 3 is an approximate cross-section through a pair of balls and a section of a ring on a line such as III III in Fig. 1, showing the relation of the balls to the rings. Fig. 4 is a similar cross-section on a line such as IV IV in Fig. 1, showing a different connection between the balls and rings.

A and B represent, respectively, the stationary and rotating sections of a vehicle-hub, between which are provided circumferential raceways C for the bearing-balls D D'. Upon two opposite sides of said balls and centrally to their axis of rotation, if extended, are mounted flaring rings E E', preferably nearly semilunar in cross-section. Said rings are of different sizes, the outer ones E being of greater diameter than the inner ones E'. The outer rings E have their flat inner faces toward the balls, and the inner rings E' have their flat outer faces toward said balls. The rings are mounted on the series of balls in the manner shown in either Fig. 3 or Fig. 4. In said figures the curvature of the rings is ignored, and they are represented as extending in right lines. As shown in Fig. 3, concave depressions e are formed in the opposing flat faces of the rings, which depressions engage the spherical surfaces of the balls. The rings are secured together by bolts F, placed at proper intervals, which hold the rings in contact with the balls. As shown in Fig. 4, the inner faces of the rings are provided with conical protuberances e', which fit corresponding recesses in the balls. With this form of pivot the rings may be made slightly narrower and of somewhat-different outer curvature, as shown in Fig. 1.

The result of the construction described is that the balls run freely in the raceways in the ordinary manner, but with the difference that they are kept from bunching and are at all times at the proper distance from each other, so that each performs its intended part as an element of the bearing. The frames rotate freely with the balls with very slight friction and are never in contact with the walls of the raceways at any point.

I claim as my invention and desire to secure by Letters Patent—

1. In a ball-bearing, a circular rotating frame within the raceway composed of two parallel rings secured together and inclosing between them the series of balls, said rings being seated on said balls coincident with the axis of rotation of said balls, substantially as set forth.

2. In a ball-bearing, a circular rotating frame within the raceway composed of two parallel flaring rings secured together and inclosing between them the series of balls, said rings being provided, on their opposed surfaces, with a series of conical protuberances, and each of said balls having two corresponding axial depressions to engage said protuberances and form pivotal seats for the rings upon said balls in line with the axis of rotation of said balls, substantially as set forth.

In testimony whereof I affix my signature in the presence of two witnesses.

JOHN FAY WILSON.

Witnesses:
H. B. BARKER,
C. E. WILSON.